Patented May 14, 1940

2,201,103

UNITED STATES PATENT OFFICE 2,201,103

INSECTICIDE AND FUNGICIDE

Frederick E. Dearborn, Washington, D. C.; dedicated to the free use of the People in the territory of the United States No Drawing. Application November 14, 1938, Serial No. 240,356

2 Claims. (Cl. 167—15)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

I hereby dedicate the invention herein described to the free use of the People in the territory of the United States to take effect on the granting of a patent to me.

This invention embraces novel products useful as insecticides and fungicides comprising intimate and nonseparable compositions of two or more new compounds of the general formula $3CuAs_2O_4.CuORS_x$, in which $RS_x$ is the anhydride of a sulfurized unsaturated monocarboxylic acid containing from one to four atoms of sulfur in the acid molecule. The acids are of the following series: $C_nH_{2n-2}O_2$, $C_nH_{2n-4}O_2$, $C_nH_{2n-6}O_2$, and $C_nH_{2n-8}O_2$.

I have found that the element sulphur may be chemically added to the unsaturated monocarboxylic acids, the sulphur being added at the double bond or bonds. Theoretically one atom of sulphur may be added to the acid molecule for each double bond present. The series $C_nH_{2n-2}O_2$, containing one double bond may add one atom of sulphur to form the new series $C_nH_{2n-2}SO_2$. It is believed that the sulphur is added in the following manner:

$CH_3.(CH_2)_7.CH=CH.(CH_2)_7.COOH$ (oleic acid) $+S$ (sulphur)$=$

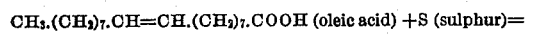
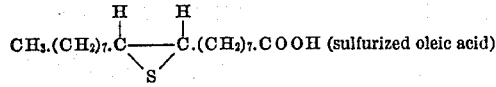

$CH_3.(CH_2)_7.C——C.(CH_2)_7.COOH$ (sulfurized oleic acid)

The series $C_nH_{2n-4}O_2$ may add one or two atoms of sulphur to form the new series $C_nH_{2n-4}S_xO_2$, where $S_x$ may represent one or two atoms of sulphur. The series $C_nH_{2n-6}O_2$ may add one, two, or three atoms of sulphur to form the new series $C_nH_{2n-6}S_yO_2$, where $S_y$ may represent one, two, or three atoms of sulphur. And the series $C_nH_{2n-8}O_2$ may add one, two, three, or four atoms of sulphur to form the new series $C_nH_{2n-8}S_zO_2$, where $S_z$ may represent one, two, three, or four atoms of sulphur. Hence, theoretically there may be as many different compounds of the same acid as there are double bonds in the acid molecule, differing only in the number of atoms of sulphur they contain. To illustrate, clupadonic acid contains four double bonds, and hence, theoretically may form the following compounds:

(a) $3CuAs_2O_4.Cu(C_{18}H_{27}SO_2)_2$
(b) $3CuAs_2O_4.Cu(C_{18}H_{27}S_2O_2)_2$
(c) $3CuAs_2O_4.Cu(C_{18}H_{27}S_3O_2)_2$
(d) $3CuAs_2O_4.Cu(C_{18}H_{27}S_4O_2)_2$

The product resulting from bringing together and causing to react a solution of an alkali metal arsenite, a solution of an inorganic cupric salt, and the product obtained by saponifying a sulfurized vegetable, animal, or fish oil or fat containing relatively large amounts of mixed glycerides of any of the unsaturated monocarboxylic acids of the series above-enumerated have been found by me to be insecticidal and fungicidal. Vegetable oil, such as cottonseed, corn, peanut, linseed, tung, soybean, etc.; animal oils, such as lard, triolein, etc.; and fish oils, such as whale, sperm, menhaden, etc., may be used. Since oils and fats are composed of the glycerides of more than one fatty acid, the product resulting will contain an intimate mixture of all of the new copper-arsenite compounds of the fatty acids present in the oil. For example, soybean oil is composed of the glycerides of the monocarboxylic acids and in approximately the following proportions: Palmitic 6.5%, stearic 4.2%, arachaidic 0.7%, lignoceric 0.1%, oleic 32.0%, linolic 49.7%, and linolenic 2.2%. Sulphur will be added to only the oleic, linoleic and linolenic acids as the other ones do not contain double bonds.

These sulfurized oil products are highly insecticidal, as found by tests against various insects. They are of a dirty green color, insoluble in water, not readily wet by the water when dried, without the use of a wetting agent, and may be prepared in a very fine state of subdivision.

In carrying out my invention I prefer to sulfurize the mixture of free unsaturated fatty acids obtained from saponifying a vegetable, animal, or fish oil instead of using the natural oil. The saturated fatty acids present may be partially removed by refrigeration and filtration, but this is not necessary unless large amounts are present. The unsaturated fatty acids are mixed with the proper weight of sulphur to produce the desired sulfurization, and heated to 200° C., preferably by an indirect method. When the temperature has reached approximately 170° C., a small amount of iodine is added as a catalyst. Between 175–185° C. an exothermic reaction takes place. This is the point when most of the sulphur combines with the fatty acids. The temperature is kept at 195–200° C. for an hour or more to insure complete reaction. The sulfurized acids are cooled and then made into a soap by neutralizing with a dilute solution of sodium hydroxide or other alkali. If an oil is sulfurized the process is the same except that in preparing the soap the sulfurized oil must be saponified with an alkali. Some oils such as linseed and tung are difficult to saponify and to handle after sulfurization. As there may be some sulphur present in the soap as the alkali sulphide, the soap may be purified by salting out from a hot or boiling solution, but this is not necessary unless an excessive amount of alkali sulphide is present.

To the hot soap solution is added a solution of an alkali metal arsenite, slightly in excess of the calculated amount. To this mixture is added slowly, with vigorous agitation, a solution of the calculated amount of a cupric salt, such as $CuSO_4$ or $CuCl_2$. The mixture should have a neutral or slightly alkaline reaction when all ingredients have been added.

Heating with agitation is continued until the gelatinous mass has coagulated sufficiently for easy filtration, when it is filtered, well washed, and dried.

The proportions of copper, arsenic, and sulfurized fatty acids to be used in preparing the new insecticide may be calculated from the general formula $3CuAs_2O_4 \cdot CuORS_x$, in which $RS_x$ represents the anhydrides of the sulfurized fatty acids obtained from an oil. By way of illustration the following examples are given:

Example 1

An insecticide prepared from the sulfurized acids of refined peanut oil will have the approximate composition:

|   | Per cent |
|---|---|
| $As_2O_3$ | 38.58 |
| CuO | 20.65 |
| S | 4.26 |

To prepare 100 grams of the product, the following weights of material will be theoretically required:

|   | Grams |
|---|---|
| Sulfurized peanut oil acids | 42.5 |
| $As_2O_3$ | 38.6 |
| $CuSO_4 \cdot 5H_2O$ | 64.8 |

Example 2

An insecticide prepared from the sulfurized acids of linseed oil will have the approximate composition:

|   | Per cent |
|---|---|
| $As_2O_3$ | 36.83 |
| CuO | 19.73 |
| S | 8.58 |

To produce 100 grams of the material the following weight of reagents will be theoretically required:

|   | Grams |
|---|---|
| Sulfurized linseed oil acids | 45.2 |
| $CuSO_4 \cdot 5H_2O$ | 61.9 |
| $As_2O_3$ | 36.8 |

Example 3

An insecticide prepared from the sulfurized acids of fish oil will have the approximate composition:

|   | Per cent |
|---|---|
| $As_2O_3$ | 39.08 |
| CuO | 20.92 |
| S | 6.00 |

To produce 100 grams of the insecticide will require theoretically the following weight of materials:

|   | Grams |
|---|---|
| Sulfurized fish oil acids | 41.6 |
| $As_2O_3$ | 39.1 |
| $CuSO_4 \cdot 5H_2O$ | 65.6 |

Example 4

An insecticide prepared from sulfurized acids of tung oil will have the approximate composition:

|   | Per cent |
|---|---|
| $As_2O_3$ | 36.10 |
| CuO | 19.38 |
| S | 9.88 |

To produce 100 grams of the insecticide will require the following materials:

|   | Grams |
|---|---|
| Sulfurized tung oil acids | 46.4 |
| $As_2O_3$ | 36.1 |
| $CuSO_4 \cdot 5H_2O$ | 60.7 |

Having thus described my invention, I claim:

1. An insecticide containing as its essential ingredients compounds of the general formula $3CuAs_2O_4 \cdot CuORS_x$, where $RS_x$ is the anhydride of a sulfurized unsaturated monocarboxylic acid containing from two to four atoms of sulfur in the acid molecule.

2. An insecticide and fungicide comprising the complex products of the reaction between a solution of an alkali metal arsenite, an inorganic cupric salt, and alkali metal salts of sulfurized oils of the group consisting of vegetable, animal, and fish oils, containing mixed glycerides of unsaturated monocarboxylic acids of the general formulas $C_nH_{2n-4}O_2$, $C_nH_{2n-6}O_2$, and $C_nH_{2n-8}O_2$.

FREDERICK E. DEARBORN.